United States Patent
Whalen et al.

(10) Patent No.: US 7,640,536 B1
(45) Date of Patent: Dec. 29, 2009

(54) VARIABLE GRAPH MINIMIZATION FOR IMPROVED MODEL-CHECKING PERFORMANCE

(75) Inventors: Michael W. Whalen, Edina, MN (US); Steven P. Miller, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 856 days.

(21) Appl. No.: 11/236,053

(22) Filed: Sep. 27, 2005

(51) Int. Cl.
*G06F 9/44* (2006.01)
*G06F 11/00* (2006.01)

(52) U.S. Cl. .................. 717/126; 717/154; 717/159; 714/38

(58) Field of Classification Search .............. None
See application file for complete search history.

(56) References Cited

U.S. PATENT DOCUMENTS

| | | | |
|---|---|---|---|
| 5,710,927 A * | 1/1998 | Robison ................. | 717/155 |
| 6,185,516 B1 * | 2/2001 | Hardin et al. .............. | 703/2 |
| 6,904,590 B2 * | 6/2005 | Ball et al. ................ | 717/132 |
| 6,957,404 B2 * | 10/2005 | Geist et al. ............... | 716/4 |
| 7,131,085 B2 * | 10/2006 | Farkash et al. ............. | 716/5 |
| 7,340,473 B2 * | 3/2008 | Paruthi et al. ............. | 707/101 |
| 7,346,486 B2 * | 3/2008 | Ivancic et al. ............. | 703/22 |

OTHER PUBLICATIONS

Felt, E. et al., "Dynamic Variable Reordering for BDD Minimization," Proceedings of the European Design Automation Conference, pp. 130-135, Sep. 1993.*

Ishiura, N. et al., "Minimization of Binary Decision Diagrams Based on Exchanges of Variables," Proceedings of the International Conference on Computer-Aided Design, pp. 472-475, Nov. 1991.*

Murthy, P. et al., "Joint Minimization of Code and Data for Synchronous Dataflow Programs," Formal Methods in System Design, vol. 11, No. 1, pp. 41-70, Jul. 1997.*

Eijk et al., C. A. J., "Exploiting Functional Dependencies in Finite State Machine Verification", in Proceedings of the 1996 European conference on Design and Test, IEEE Computer Society, pp. 9-15, 1996.

Halbwachs et al., N. "The synchronous dataflow programming language LUSTRE", Proceedings of the IEEE, vol. 79, No. 9, pp. 1305-1320, Sep. 1991.

Hu et al., A. J., "Reducing BDD Size by Exploiting Functional Dependencies", in Proceedings of the 30$^{th}$ International Conference on Design Automation, Dallas, Texas, United States, pp. 266-271, 1993.

Tip, F., "A Survey of Program Slicing Techniques", Technical Report CS-R9438, Centrum voor Wiskunde en Informatica, 1994.

* cited by examiner

*Primary Examiner*—Michael J Yigdall
(74) *Attorney, Agent, or Firm*—Matthew J. Evans; Daniel M. Barbieri

(57) ABSTRACT

A method of verifying properties of a source program includes creating a directed multigraph from the source program. The directed multigraph is then minimized by identifying removable vertices in the multigraph. Based on the minimization of the directed multigraph, the source program is transformed by inlining variables in the source program to produce a transformed program. The transformed program is then model checked using a model checking tool in order to verify properties of the source program.

12 Claims, 7 Drawing Sheets

```
module COUNTER (val_init, val_incr: int;
                reset: bool)
    returns (n: int);
var
   internal : int;
let
   internal =
      if reset then
         val_init
      else
         pre (n) + val_incr;
   n = val_init - > internal;
tel.
```
FIG. 1
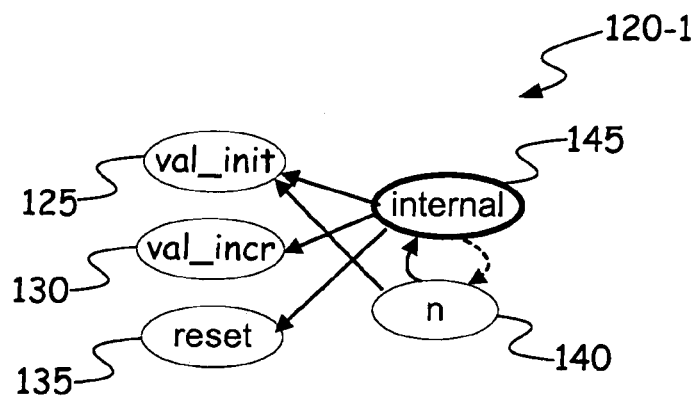
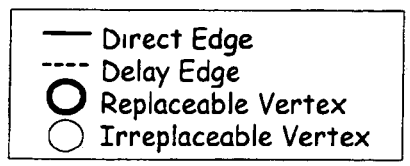
FIG. 2-1

```
   Create_Graph(N, PV)=
1      V ← input_vars(N) ∪
2          output_vars (N) ∪
3          local_vars (N)
4      for each question χ = e in equations (N) do
5          for each variable reference y in e do
6              E ← if y is inside a pre operator then
7                  E ∪ {delay (χ,y)}
8              else
9                  E ∪ {direct (χ,y)}
10     for each v ∈ V do
11         color(v) ←
12             if v ∈ (input_vars(N) ∪
13                 ouput_vars(N) ∪ PV) then
14                 Irreplaceable
15             else
16                 Replaceable
17     return (V,E)
```

FIG. 3

```
   Is_Removable_Vertex ((V, E), v)=
1      delay_in ← (exists y | delay (y,v) ∈ E)
2      delay_out ← (exists y | delay (v,y) ∈ E)
3      return (color(v) = Replaceable and
4          not (delay_in and delay_out)
```

FIG. 4

```
module TEST (val_init, in: int)
        returns (out: int);
var
     foo : int;
let
     foo = val_init - > pre (in);
     out = val_init - > pre (foo);
tel.
```

600

Remove_Vertex ((V,E), v) =
   for each pair of edges {delay(v,b), direct(a,v)} in V do:
      E ← E + {delay(a,b)}
   for each pair of edges {direct(v,b), delay(a,v)} in V do:
      E ← E + {delay(a,b)}
   for each pair of edges {direct(v,b), direct(a,v)} in V do:
      E ← E + {direct(a,b)}
   for each edge e referencing v do:
      E ← E - {e}
   V ← V - {v}
      Return (V,E)

FIG. 6

VARIABLE GRAPH MINIMIZATION FOR IMPROVED MODEL-CHECKING PERFORMANCE

BACKGROUND OF THE INVENTION

The present invention relates generally to model checking, which is an automated approach to proving properties about programs through exhaustive state space exploration. More particularly, the present invention relates to a preprocessing method and system for model-checking languages which can be used to improve performance of model checking tools.

Model checking (both explicit state and symbolic) has been successfully used to verify properties of various finite state systems, such as communications protocols, concurrent systems, hardware designs, and software systems. The primary limitation of model checking is the state space explosion problem, which limits the size of systems that can be successfully checked by a model checker.

For implicit state model checkers, the state space is not explicitly represented; instead, sets of states, and the model itself, are described as a formula over a set of Boolean variables. For these tools, it is not only the number of reachable states but also the size of the Boolean representation of the state and the model that determine whether or not a tool is able to successfully analyze the model.

For implicit state model checking tools, it is well known that the structure of the Boolean formula representing the model affects the difficulty of verifying properties over it, and a considerable amount of research has been done to try to minimize the size of the Boolean representation of a model. Many checkers, such as the Symbolic Model Verifier (SMV) available from Carnegie Mellon University and the Symbolic Analysis Laboratory (SAL) available from Stanford Research Institute (SRI) Inc. are based on Binary Decision Diagram (BDD) representations of Boolean formulae. BDDs provide a compact, efficient encoding of Boolean formulae. The performance of logical operations on BDDs, and therefore model checking tools based on BDDs, is sensitive both to the number of variables necessary to encode the model and also to the ordering of variables within the BDD.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of preprocessing a synchronous language program to improve model checking performance includes creating a directed multigraph from the source program. The directed multigraph is then minimized by identifying removable vertices in the multigraph. Based on the minimization of the directed multigraph, the source program is transformed by replacing variables with their defining equation (inlining) in the source program to produce a semantically equivalent transformed program with fewer variables. The transformed program is then analyzed using a model checking tool in order to verify properties about the source program.

BRIEF DESCRIPTION OF THE DRAWINGS

FIG. 1 is a representation of a program module.

FIG. 2-1 is a diagrammatic illustration of a directed multigraph corresponding to the module represented in FIG. 1.

FIG. 2-2 is a diagrammatic illustration of a minimized directed multigraph corresponding to the graph shown in FIG. 2-1.

FIG. 3 is a representation of pseudocode which can be used to create an initial directed multigraph for a corresponding module.

FIG. 4 is a representation of an algorithm which can be used to identify removable vertices from a directed multigraph.

FIG. 5-1 is a representation of a program module.

FIG. 5-2 is a representation of a directed multigraph corresponding to the module illustrated in FIG. 5-1.

FIG. 6 is a representation of an algorithm for removing a vertex on a multigraph, which is tantamount to inlining an associated variable from the corresponding module.

DETAILED DESCRIPTION OF THE PREFERRED EMBODIMENTS

Figure 2:
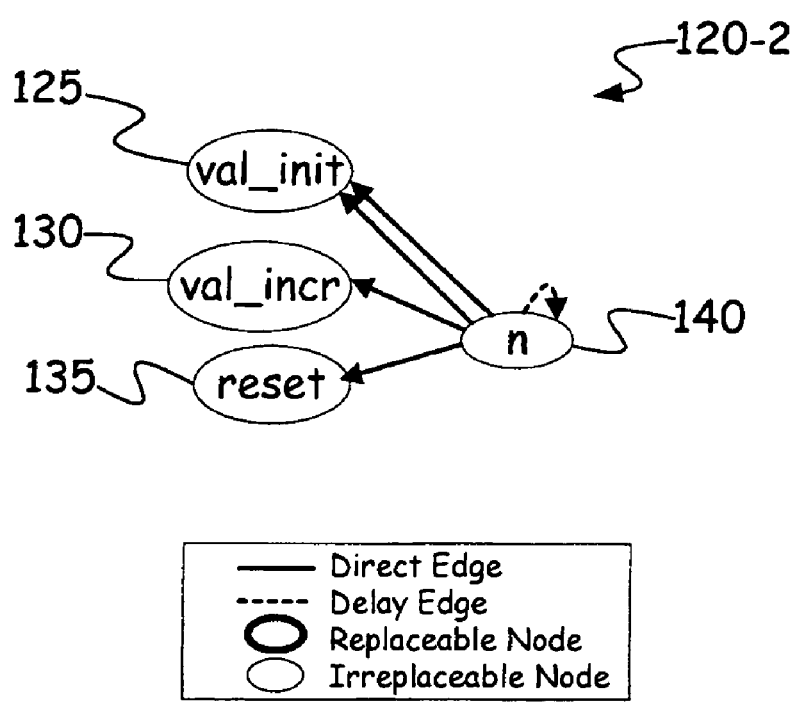

The present invention is based in part upon the recognition that it is possible to transform a synchronous language program to make it more efficient to analyze using a BDD-based model checking tool. A program is transformed to create behaviorally equivalent program that is much more efficient to verify using BDD-based symbolic model checkers than the original program. The methods utilize one or more transformations such as duplicate variable elimination, partial evaluation, and variable inlining in the model preprocessing. A primary optimization is a preprocessing step that aggressively inlines "unnecessary" local variables. New algorithms described herein are provided to accomplish the inlining processing step(s). The difference in model checking performance between the inlined and non-inlined programs is dramatic. In examples used for verification, the worst-case improvement was a 34×speedup, and in several cases the inlined version was several orders of magnitude faster than the non-inlined program. On average, the methods removed 86.2% of the BDD variables necessary to represent the program symbolically.

The disclosed methods have been used to verify large programs, for example programs created with Simulink and SCADE which are well known in the art, using several different model checking tools. In many applications, it is not unusual to see models consisting of several hundred subsystems and thousands of variables. BDD-based tools have a performance limit (conservatively) of 500 variables, so these programs are far too large to analyze without optimization. However, in examining the structure of the programs, it has been determined that many of the variables could be inlined, making the model checking problem tractable.

By inlining most or all of the functionally dependent variables (using the dataflow structure of the program as a guide), a dramatic increase in the size of programs that can be successfully analyzed is achieved. For instance, it was observed that one example Simulink model contained 609 subsystems and 9348 basic blocks. The SMV program, after straightforward translation, contained 3210 variables in the SMV language, and it was discovered to be computationally intractable to build the BDD encoding necessary for model-checking. After a maximal inlining, the program contained 37 variables. Many of these variables had assignments that are several thousand lines long, and the size of the program as a whole was over 130,000 lines long. However, the program can be easily analyzed using model checking tools, in this case by both NuSMV and SAL, in just a few seconds.

A key insight for this inlining process is that many of the variables within a program are functionally dependent on other variables. Although existing tools provide some syntactic mechanisms to allow users to describe some of these functional dependencies, these mechanisms are limited to a subset of the potential functionally dependent variables and require users to properly encode these relationships. By automatically transforming programs, the burden on the end user is relieved, more aggressively transforming the program into something that is much more efficient to model check.

Synchronous Languages

The input languages to many BDD-based model checking tools such as SMV and SAL can be viewed as members of the class of synchronous dataflow languages, which also includes several requirements and programming languages, such as Simulink, SCADE, Lustre, and SIGNAL. The source code for a synchronous language can be called a model, specification, or program depending on the language and the user community. Each of these terms are equivalent, and in this document, the source code shall be referred to as a program.

These languages share the same semantic model but each has a different syntax. As an analogy, C and Pascal are both imperative programming languages that share the same semantic model but different syntaxes. To explain the semantic structure of these languages, we will use the Lustre syntax, which is well known in the art. However, the invention is equally applicable to any synchronous dataflow language.

The core of a synchronous language is a set of variables and assignment equations of the form X=E, where X is a variable and E is an assignment expression. These equations are considered in the mathematical sense: the equation X=E defines variable X as being identical to expression E. It is this principle that makes syntactic manipulation of synchronous dataflow programs straightforward, and guarantees the correctness of the inlining procedures described below.

Computation occurs in steps in which the values of all variables are re-computed. The order of this recomputation is determined by the data dependencies of the assignment expressions: if x=y+1, then x is data dependent on y and must be computed after y. Systems of assignments that contain circular data dependencies between variables (e.g., {x=y+1; y=x−1}) may have zero or multiple solutions and are disallowed.

To record state information and allow benign mutual reference between variables, a delay operator is added. The operator returns the value of an expression delayed one step. For example, {X=2a−Y; Y=1→pre(X)+d} defines a system where X is equal to 2a minus the current value of Y, and Y is equal to 1 in the initial step and is thereafter equal to the previous value of X plus the current value of d. Lustre allows nesting of pre operators to allow reference to previous values k-steps back, where k is the depth of nesting of the pre operators. This is in contrast to most synchronous languages, which do not allow nesting of delay operators. For this reason, Lustre is a k-state language and the synchronous languages that do not allow nested delays are two-state languages. A k-state Lustre program can be rewritten into a two-state program by a straightforward transformation that introduces additional variables to represent nested pre operators. The transformations described in the sequel assume a two-state Lustre program.

Lustre programs are organized into modules, often referred to as nodes, which package equations into modules that can be reused within a program. A module consists of an interface specification (the input and output parameters) and a body, which declares local variables and defines the assignment equations for local and output variables. An example of a Lustre module is as follows:

```
module COUNTER (val_init, val_incr: int; reset: bool)
   returns (n: int);
var
   internal : int;
let
   internal=
      if reset then
         val_init
      else
         pre (n)+val_incr;
   n=val_init->internal;
tel.
```

Figures 1, 2, 5:
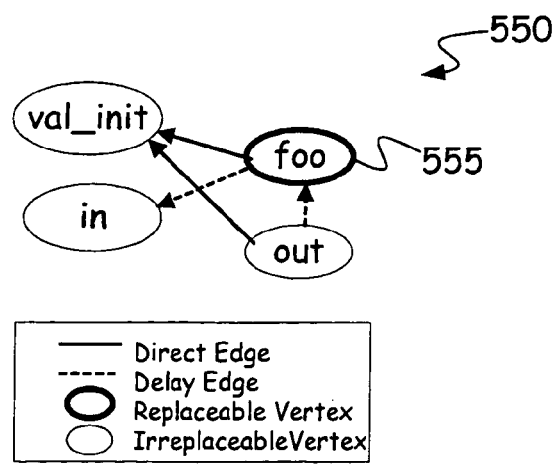

This module, which is also shown in FIG. 1 (at reference number 100), implements a resetable counter, with an initial value and an increment value.

In the initial instant, the value of the counter n is val_init. In all subsequent instants, it is equal to the internal variable named "internal". The variable internal is assigned val_init when reset is true, and otherwise is assigned the increment val_incr added to the previous output of the counter n.

Modules can be instantiated within other equations, similar to function calls in an imperative language. For example, the following expression defines a modulo 10 counter:

mod 10=COUNTER(0,1,false−.pre(mod 10)=9);

Lustre does not allow recursive module instantiations, so it is straightforward to replace a module call expression with the inline expansion of the referenced module. For example purposes, to simplify the presentation of the variable inlining process in the rest of this disclosure, assume that the Lustre program consists of a single "flattened" module.

Lustre also supports clocks, which allow different portions of a program to run at different rates. Clocks are implemented by Boolean expressions that define when a variable should be re-computed. It is possible to take a Lustre program with multiple clocks and to create an equivalent Lustre program without clocks by introducing some additional variables and adding stuttering to the assignment equation, in which a variable is reassigned its previous value. This transformation can be automatically performed by appropriately configured frameworks, so for the remainder of the disclosure, assume that the program has only one global clock.

There is a distinction between functional and relational dataflow languages. Most of the model checking languages such as the SAL and SMV languages are relational in that they allow assignments to nondeterministically assigned values within a particular range to a variable. This allows exploration of a tree of possible next steps from a particular state. On the other hand, most of the synchronous specification and programming languages such as Simulink, Lustre, and SCADE are functional; all the assignments to variables allow only one possible value to be assigned.

The disclosed algorithms are applicable to any synchronous dataflow language, after tailoring to the particular syntax of the language in question. For illustrative purposes, the algorithms are illustrated using the Lustre language, which is well known in the art. However, the present invention is not limited to use with the Lustre language.

Removing Functionally-Dependent Variables

Two operations that are performed over the source syntax in disclosed methods include removing duplicate variables and inlining unnecessary variables. Both of these can be viewed as removing functionally dependent variables. The performance of BDD-based model checkers is correlated to the number of distinct variables in the BDD and their order within the BDD. Intuitively, if variables whose values are highly correlated are separated in the total ordering of the BDD, then the BDD will become very large. Unfortunately, for some problems, there is no good variable ordering because moving some correlated variables closer together will move other correlated variables apart.

Functionally dependent variables are those variables whose values can be computed as a function of other variables within the BDD. These variables are obviously correlated to the variables that they are computed from, and so placing them in an appropriate place within a BDD is crucial to good performance. Unfortunately, most programs contain a preponderance of these variables, and it is difficult to place them all within a BDD and still generate an acceptably sized BDD. The idea behind removing the functionally dependent variables is to shrink the BDD to an acceptable size by transforming the original BDD containing the functionally dependent variables into a new BDD that does not contain the variables but behaves equivalently for the properties of interest.

Formally, a BDD variable y is functionally dependent on a set of BDD variables $\chi_1, \ldots \chi_n$ (if and only if) there exists a function $f$ such that $y=f(\chi_1, \ldots, \chi_n)$. This idea can be extended in an obvious way for vectors of BDD variables $\vec{y}$: $\vec{y}$ is functionally dependent on $\vec{x}$ if there exists a vector valued function $f$ such that $\vec{y}=f(\vec{x})$.

Although the prior art includes methods of implementing different algorithms to remove these unnecessary functionally dependent variables given a BDD representation of a program, they differ from the present invention. More particularly, they differ in that the present invention operates over the source program rather than its BDD representation, and so many of the properties that must be discovered in the BDD space (e.g., the dependency function necessary to extract the variable) are directly provided by the program. Also, the methods of the present invention do not require that the BDD for the program be created before being minimized. As the creation of the BDD can be very expensive (or exceed the available memory on the computer), performing this minimization as a preprocessing step yields significant performance benefits.

Approach

Synchronous dataflow languages are increasingly being used to specify the behavior of software systems, including safety critical software systems such as avionics software systems. An important reason for this use is that programs in these languages can be formally checked for correctness using automated tools such as model checkers. This invention significantly increases the size of programs that can be formally verified by BDD-based tools by transforming a program into a behaviorally equivalent program that is mush more efficient to model check using BDD-based tools.

Programs as Graphs

The variable inlining procedure can be performed in two steps. First, a directed multigraph can be created based on the program, and this graph is minimized in order to determine which variables are functionally dependent and can be removed from the program. Second, the inlining is actually performed by replacing each functionally dependent variable with its assignment expression. By first building and manipulating a graph, the performance of the inlining process is increased, and different minimization algorithms can also be easily experiment with.

A Lustre module (or more generally, any synchronous dataflow language module) can be viewed as a directed multigraph whose vertices are the variables within the module and whose edges are defined by data dependencies between the variables. An example of the graph 120-1 for the COUNTER module 100 described above is provided in FIG. 2-1.

In embodiments of the present invention, there are two different kinds of edges to distinguish: direct edges and delay edges. Both types are shown in directed multigraph 120-1 shown in FIG. 2-1. Direct edges occur when there is a direct data dependency between the variables, that is, when the assignment of one variable references another variable outside of a delay operator. Delay edges occur when there is a delayed data dependency between two variables, that is, when the assignment of one variable references another variable within a delay operator. Since an assignment may contain several references to the same variable, the graph is a multigraph in which several edges may connect two vertices. There are also two kinds of vertices to distinguish: replaceable and irreplaceable vertices. Replaceable vertices are candidates for inlining, while irreplaceable vertices are not, for reasons discussed in the next section.

In FIG. 2-1, the COUNTER module 100 represented by graph 120-1 takes three inputs: val_init (represented by vertex 125), which is the initial value of the counter; val_incr (represented by vertex 130), which is the amount added to the counter in each computational step; and reset (represented by vertex 135), which when TRUE, resets the counter to val_init. The counter module 100 represented by graph 120-1 also returns one output, n (represented by vertex 140), which is the current value of the counter. Also shown in graph 120-1 is a local variable, internal (represented by vertex 145), to factor the computation of the counter. The counter has two equations that assign internal and n. To assign internal, a check is made to determine whether a reset has occurred. If so, then the counter should be reset to its initial value (val_init). Otherwise, the previous value of the counter (pre(n)) should be incremented by the counter increment (val_incr). The output of the counter n is simply internal (represented by vertex 145) except in the first computational step. In the first computational step it is set to the initial value (val_init). The n=val_init->internal equation means that in the initial computational step n=val_init, and in all steps thereafter n=internal.

Graph Minimization

The number of vertices in the dependency graph should be minimized in such a way that the resulting graph still respects certain properties. Since each vertex corresponds to a variable, if the number of vertices is minimized, the minimal set of variables necessary to describe the program is determined.

In order to ensure that the inlined module matches the behavior of the original module when analyzed, it is ensured that certain irreplaceable variables (represented by vertices) are not inlined. The following variables are irreplaceable and thus cannot be inlined:
1. the inputs and outputs of the node,
2. any local variables that are referenced within a property to be verified,
3. any variables that are self-referential,
4. any variables that have relational assignments,
5. any variables that, if inlined, would yield an n-state program where n is greater than two.

The first requirement ensures that process does not change the signature of the module. It is possible to relax the first property if a flow analysis (slicing) of the program is performed to determine which inputs and outputs are used by the properties of interest; however, this makes counterexamples more difficult to replay against the original program.

The second requirement ensures that variables that are necessary to check the behavior of the program are not removed.

The third requirement describes, in essence, what it means for a variable to be functionally dependent. If a variable does not refer to itself, then it can be computed entirely in terms of other variables, i.e., it is functionally dependent upon those variables. We can safely replace any such variable with its assignment expression.

The fourth requirement is necessary to ensure that the program behaves the same way before and after inlining. Consider an assignment expression for a variable X that defines a relation rather than a function, and two variables Y and Z that reference X:

$X=\text{one\_of}\{1,2,3\};Y=X+1;Z=X+1;$

By inlining X, the following is derived:

$X=\text{one\_of}\{1,2,3\}+1;Z=\text{one\_of}\{1,2,3\}+1;$

In the original program, the assertion Y=Z is always true, while in the inlined program, it is falsifiable, since in the inlined program Y and Z can each choose a different value from one_of {1,2,3}, whereas in the original program this nondeterministic choice is fixed by X.

The fifth property has to do with the resulting structure of the inlined program. Because the model checking languages that are targeted are typically two-state languages, it is desirable to ensure that after inlining, the Lustre program is a two-state program, i.e., it does not contain any nested pre-expressions for any assignments.

FIG. 2-2 illustrates a minimized directed multigraph 120-2 corresponding to directed multigraph 120-1 shown in FIG. 2-1. In minimized directed multigraph 120-2, vertex 145 named internal has been removed. Vertex 145 is could be removed because it does not fit within any of the irreplaceable criteria described above, and because it does not have both an incoming delay edge and an outgoing delay edge. Note that multigraph 120-2 has different direct edges to vertices 125, 130 and 135, including having two separate direct edges to vertex 125 and a delay edge to itself, relative to its behaviorally equivalent directed multigraph 120-2. Since directed multigraph 120-2 has less vertices, and therefore the corresponding program will have less variables, model checking will be more efficient. When carried out on large source programs containing thousands of variables, the number of inlined variables is also very large, allowing efficient model checking using conventional BDD-based model checking tools. Further discussion of the removal of vertices is provided below.

Creating the Initial Graph

To create or build the initial graph (for example, graph 120-1 shown in FIG. 2-1), one can start by examining the variable declarations and assignment equations of the module (for example, module 100 shown in FIG. 1). Pseudocode 300 for this operation is shown in FIG. 3. As shown in the pseudocode example shown in FIG. 3, the parameters to this operation are the Lustre module N and the set of variables used in the properties to be checked of the program PV. In this algorithm, all input/output variables and variables used in properties are immediately flagged as irreplaceable.

It is assumed that this process starts from a valid program which does not have any direct cyclic references between variables (discussed in above with reference to Synchronous Languages), so there will be no cycles in direct edges between vertices, although there may be cycles in delay edges between vertices. It is also assumed that the program is two-state, that is, additional variables have been introduced as necessary to the program so that none of the assignment equations contain nested pre operators.

Determining Removable Vertices

The next step in the process is to remove, according to some minimality criteria, the replaceable, functionally dependent vertices, such that a two-state program is maintained. To determine whether a vertex can be removed, its status flag and its edges are examined. In accordance with the present invention, a vertex can be removed if:

1. it is 'replaceable'
2. it does not have both an incoming delay edge and an outgoing delay edge An algorithm 400 for this determination is described in FIG. 4.

The first criteria ensures that a variable that is essential to any property of interest is not removed. The second criteria ensures both that any self-referential variables are not removed, and that the resulting program remains two-state. If a variable is self-referential, this self-reference must be in a delay expression, so the graph will have a single delay edge that is both incoming and outgoing. To see how this constraint preserves a two-state program, it is easiest to illustrate with an example, shown in FIG. 5-1. Note that it is possible to define alternate criteria that can be used to identify removable vertices. Any such alternate criteria are considered to be within the scope of the invention.

The module 500 in FIG. 5-1 would generate the graph 550 shown in FIG. 5-2. If one tried to inline the foo variable (represented by vertex 555), it would result in the following definition for out:

$\text{out}=val\_init\text{->}pre(val\_init\text{->}pre(foo));$

This inlining contains a nested pre-expression and therefore cannot be directly realized in a model checking language. However, the constraint on delay edges described above ensures that this vertex will not be removed since it has both an incoming delay edge and an outgoing delay edge.

Removing a Vertex

Removing a vertex from the graph is tantamount to inlining the associated variable (call it χ). Thus, in the program, each reference to χ will eventually be replaced with the assignment expression for χ. This means that if the assignment of some variable y referenced χ, it will now reference all of the variables in the assignment expression for χ instead. An algorithm 600 for this replacement on the multigraph is shown in FIG. 6.

When adding an edge, if either of the existing incoming or outgoing edges is a delay edge, then the added edge will be a delay edge, otherwise, it will be a direct edge. When thinking about the inlining of actual code, if the incoming edge is a delay edge, then the vertex to be removed v is in a pre expression, so after inlining, the entire assignment expression for v will be inside a pre expression. In the other case, if the outgoing edge is a delay edge, then the referenced variable in v's assignment expression is inside a pre expression, so after inlining, it will still be inside a pre expression. The case in which the both incoming and outgoing edges are delay edges is not handled, because in this case the vertex is not a candidate for removal.

A graph is maximally reduced if it is not possible to remove another vertex without violating the criteria described in the section entitled Determining Removable Vertices. Recall that these criteria were: 1) that it is 'replaceable'; and 2) that it does not have an incoming delay edge and an outgoing delay edge. Note that not all maximally reduced graphs have the same number of vertices.

Inlining Variables in the Program

As part of the graph minimization process, one can create a set (for example called 'removed') which contains all of the vertices removed from the graph, which corresponds to the functionally dependent variables that can be inlined. To perform the inlining step, we simply look up the assigning equation within the module for the variable of interest, remove it from the module, and replace all instances of the variable with its assigning equation. Substitution principles, for example the Lustre substitution principle, ensure that the behavior of the inlined program is equivalent to the original program.

As might be expected, this can lead to an exponential growth in the size of the abstract syntax tree of the program. However, if the abstract syntax tree is viewed as a directed graph, then in fact the inlining process does not increase the size of the graph at all, as we are simply switching the pointer of the variable reference expression to point to the assignment expression for the variable.

Method and System

Figure 7:
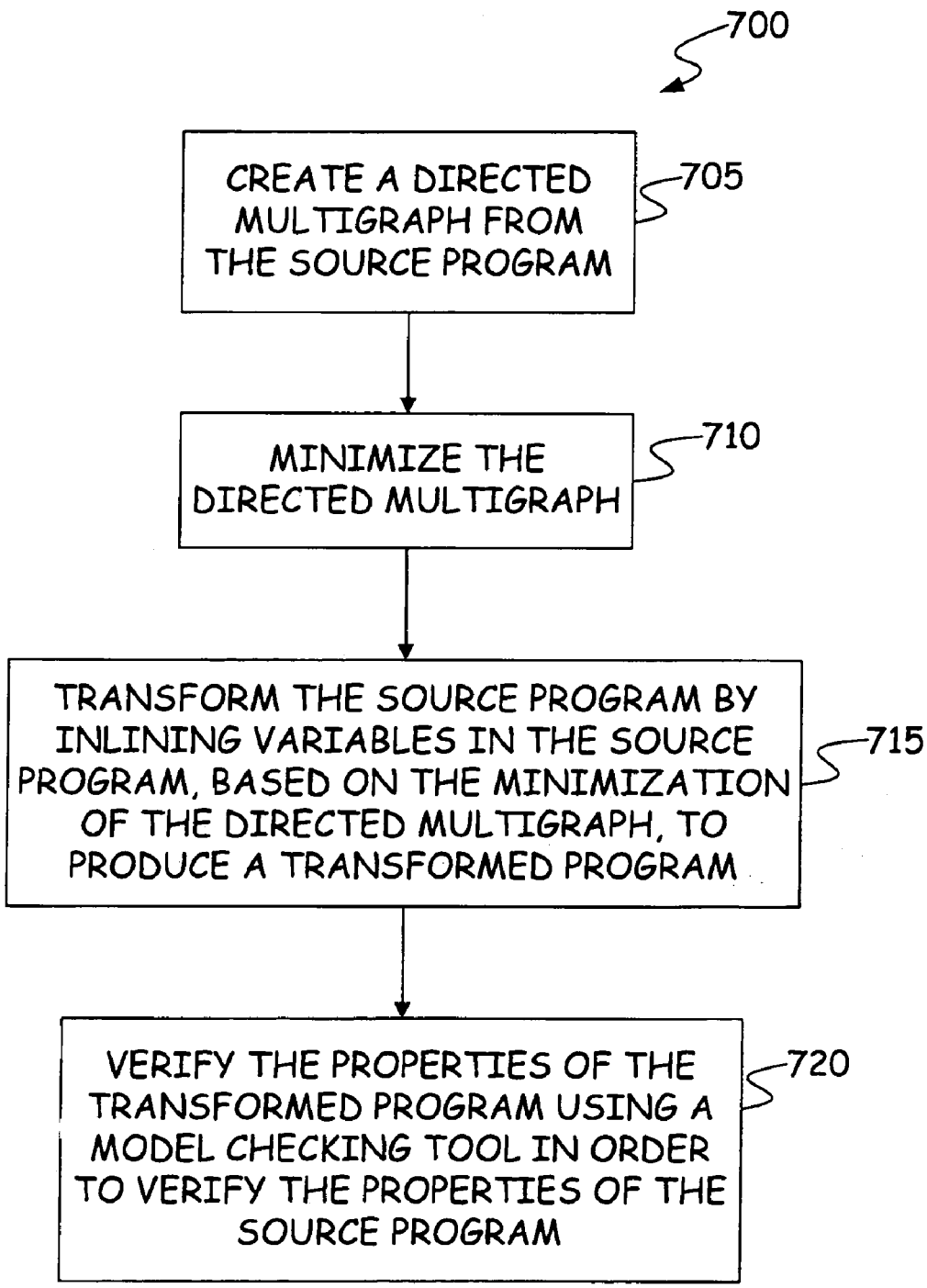
FIG. 7 is a flow diagram illustrating method embodiments.
Figure 8:
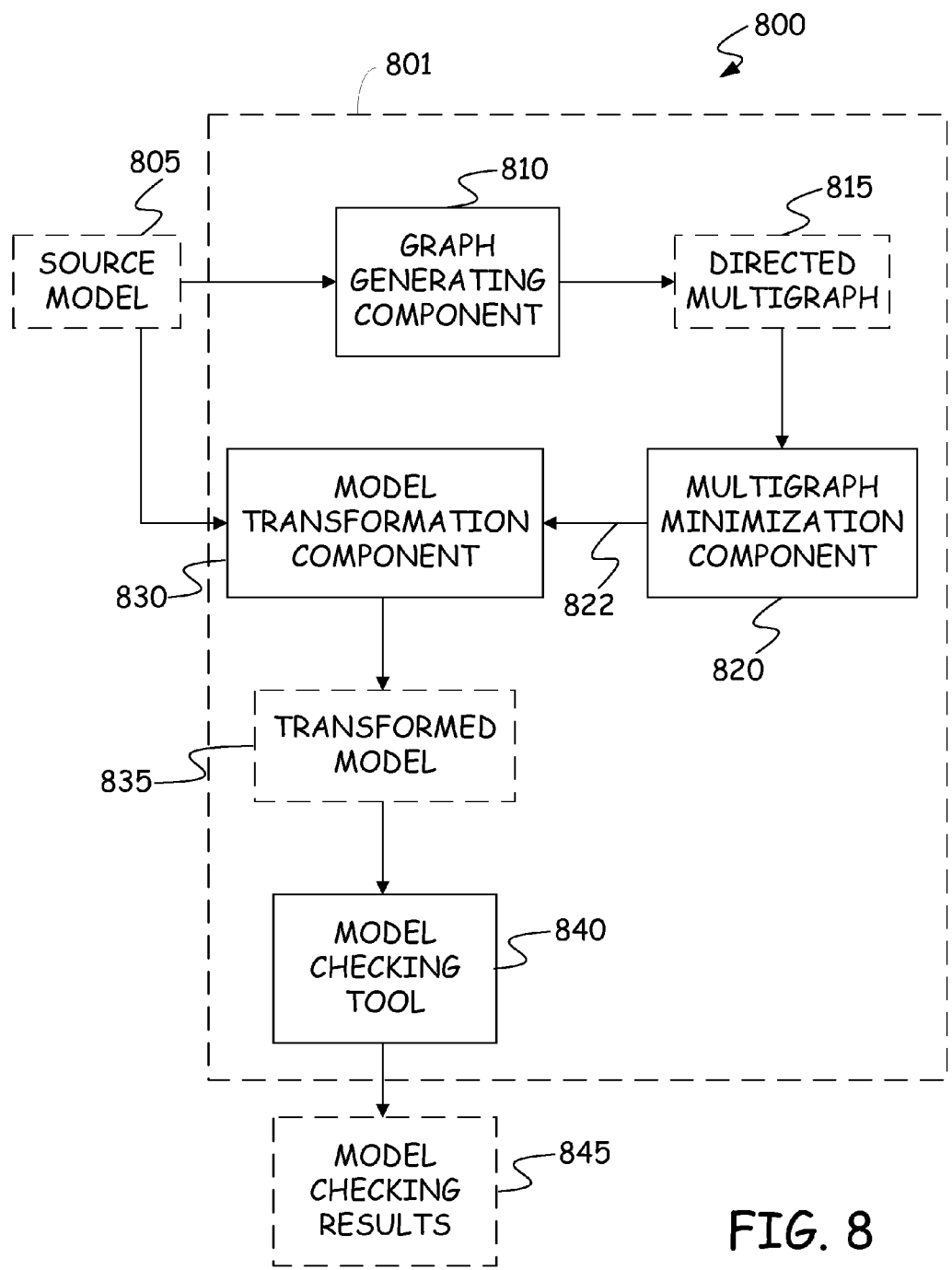
FIG. 8 is a block diagram illustrating a system for preprocessing a source program to make model checking more efficient.

Referring now to FIG. 7, shown is a flow diagram illustrating a method 700 of model checking a program. The method 700 illustrated in FIG. 7 is an example of methods which can be used to implement the concepts disclosed above. Other method embodiments also fall within the scope of the invention. Shown in FIG. 8 is a block diagram of an example program preprocessing system 800 for expanding capabilities of implicit state model checking tools. In an exemplary embodiment, system 800 is configured to implement a method such as method 700. Therefore, for illustrative purposes, FIGS. 7 and 8 are described together.

As shown in FIG. 7, the method 700 includes the step 705 of creating a directed multigraph 815 from the source program 805. This step, which has been described above in greater detail, can be implemented in graph generating component 810 shown in FIG. 8. Next, as shown at step 710 shown in FIG. 7, the method includes minimizing the directed multigraph, which was also described previously in detail. This step can be implemented, for example, by multigraph minimization component 820 of system 800 shown in FIG. 8. The output 822 of minimization component 820 can be in a variety of different formats. For example, the output 822 can be a minimized multigraph with appropriate vertices removed. In an alternative, the output 822 can be the above-described set which contains all of the vertices removed from the graph, which corresponds to the functionally dependent variables that can be inlined in the source program.

As shown at step 715 in FIG. 7, after minimizing the directed multigraph, the method includes transforming the source program 805 by inlining variables in the source program, based on the minimization of the directed multigraph, to produce a transformed program 835. This step can be implemented by program transformation component 830 shown in FIG. 8. Finally, the method 700 can include the step 720 of verifying properties of the transformed program 835 using a model checking tool in order to verify properties of the source program. In the system diagram shown in FIG. 8, this step can be implemented, for example, by model checking tool 840 in order to generate verification results 845 which determine whether properties of interest hold on the source program 805. Model checking tool 840 need not be a component of system 800 in all embodiments. Instead, system 800 can be used in conjunction with model checking tool 840 as described.

Although the present invention has been described with reference to preferred embodiments, workers skilled in the art will recognize that changes may be made in form and detail without departing from the spirit and scope of the invention. For example, while system 800 illustrated in FIG. 8 is described with reference to separate components configured to implement functions such as those described in the method steps illustrated in FIG. 7, those of skill in the art will recognize that one or more of these components can be combined, or that other components can be added, without departing from the spirit and scope of the invention. Further, those of skill in the art will recognize that components can be implemented in suitably programmed or configured processing circuitry 801, and that the same processing circuitry 801 can be configured to implement these different components.

What is claimed is:

1. A method of verifying properties of a source program, the method comprising:

creating a directed multigraph, using a processor, from the source program such that the directed multigraph includes vertices corresponding to variables within the source program, and such that the directed multigraph includes edges between the vertices corresponding to data dependencies between the variables, and wherein creating the directed multigraph from the source program such that it includes edges between the vertices corresponding to the data dependencies between the variables further comprises creating direct edges between vertices when there is a direct data dependency between corresponding variables, and creating delay edges between vertices when there is a delayed data dependency between corresponding variables;

minimizing, using the processor, the directed multigraph, wherein minimizing the directed multigraph comprises identifying removable vertices in the directed multigraph, wherein to be identified as removable, a vertex in the directed multigraph must be identified as replaceable and must satisfy a condition of not having both an incoming delay edge and an outgoing delay edge;

transforming the source program, using the processor, by inlining variables in the source program, based on the minimization of the directed multigraph, to produce a transformed program; and verifying properties of the transformed program, using the processor, using a model checking tool in order to verify the properties of the source program.

2. The method of claim 1, wherein the source program and the transformed program are behaviorally equivalent synchronous language programs, and wherein verifying the properties of the transformed program using the model checking tool comprises verifying the properties of the transformed program using a BDD-based model checking tool.

3. The method of claim 1, wherein minimizing the directed multigraph further comprises using the directed multigraph to determine which variables in the source program are functionally dependent and can be removed from the source program during the transforming step.

4. The method of claim 3, wherein using the directed multigraph to determine which variables in the source program are functionally dependent and can be removed from the source program during the transforming step further comprises identifying each of a plurality of vertices of the multigraph as being either irreplaceable or replaceable.

5. The method of claim 4, wherein minimizing the directed multigraph further comprises removing vertices, from the multigraph, which have been identified as removable.

6. The method of claim 1, wherein inlining variables in the source program comprises replacing each functionally dependent variable in the source program with a corresponding assignment expression.

7. A program preprocessing system for expanding capabilities of implicit state model checking tools, the system comprising:
 processing circuitry configured to implement system components comprising:
  a graph generating component configured to receive a source program as an input and to create in response a directed multigraph from the source program, wherein the graph generating component is configured to create the directed multigraph such that it includes vertices corresponding to variables within the source program, and such that it includes edges between the vertices corresponding to data dependencies between the variables, the edges being direct edges between vertices when there is a direct data dependency between corresponding variables, and being delay edges between vertices when there is a delayed data dependency between corresponding variables;
  a graph minimization component configured to minimize the directed multigraph, wherein the graph minimization component is configured to use the directed multigraph to determine which variables in the source program are functionally dependent and can be removed from the source program by identifying each of a plurality of vertices of the multigraph as being either irreplaceable or replaceable, wherein the graph minimization component is further configured to identifying removable vertices in the directed multigraph, wherein to be identified as removable, a vertex in the directed multigraph must be identified as replaceable and must satisfy a condition of not having both an incoming delay edge and an outgoing delay edge; and
  a program transformation component configured to receive the source program as an input and to transform the source program by inlining variables in the source program, based on the minimization of the directed multigraph, to produce a transformed program.

8. The program preprocessing system of claim 7, and further in combination with an implicit state model checking tool configured to verify properties of the transformed program in order to verify properties of the source program.

9. The program preprocessing system of claim 7, wherein the source program and the transformed program are behaviorally equivalent synchronous language programs.

10. The program preprocessing system of claim 7, wherein the graph minimization component is configured to use the directed multigraph to determine which variables in the source program are functionally dependent and can be removed from the source program by the program transformation component.

11. The program preprocessing system of claim 10, wherein the graph minimization component is further configured to remove vertices, from the multigraph, which have been identified as removable.

12. The program preprocessing system of claim 7, wherein the program transformation component is configured to inline variables in the source program to produce the transformed program by replacing each functionally dependent variable in the source program with a corresponding assignment expression.

* * * * *